United States Patent
Long et al.

(10) Patent No.: US 10,657,206 B2
(45) Date of Patent: May 19, 2020

(54) GRAPHICAL USER INTERFACE SYSTEM AND METHOD FOR NATURAL LANGUAGE GENERATION EDITING

(71) Applicant: STATS LLC, Chicago, IL (US)

(72) Inventors: Adam Long, Durham, NC (US); Robert Allen, Durham, NC (US); Ren Bauer, Durham, NC (US); Robert C. Rogers, Durham, NC (US); Anne Johnson, Durham, NC (US); Joe Procopio, Durham, NC (US)

(73) Assignee: STATS LLC, Chicago, IL (US)

( * ) Notice: Subject to any disclaimer, the term of this patent is extended or adjusted under 35 U.S.C. 154(b) by 307 days.

(21) Appl. No.: 14/645,354

(22) Filed: Mar. 11, 2015

(65) Prior Publication Data

US 2017/0300477 A1 Oct. 19, 2017

(51) Int. Cl.
*G06F 17/27* (2006.01)
*G06F 17/28* (2006.01)
*G06F 16/22* (2019.01)

(52) U.S. Cl.
CPC .......... *G06F 17/2881* (2013.01); *G06F 16/22* (2019.01); *G06F 17/2785* (2013.01)

(58) Field of Classification Search
CPC ............. G06F 17/2881; G06F 17/2785; G06F 17/30312
See application file for complete search history.

(56) References Cited

U.S. PATENT DOCUMENTS

| | | | | |
|---|---|---|---|---|
| 8,355,903 | B1* | 1/2013 | Birnbaum | G06Q 10/10 |
| | | | | 704/9 |
| 8,886,520 | B1* | 11/2014 | Nichols | G06F 17/30719 |
| | | | | 704/1 |
| 9,720,899 | B1* | 8/2017 | Birnbaum | G06F 16/95 |
| 10,505,825 | B1* | 12/2019 | Bettaiah | G06F 16/22 |
| 2008/0208907 | A1* | 8/2008 | Tolve | G06Q 10/06 |
| 2009/0254337 | A1* | 10/2009 | Sprecher | G06F 17/271 |
| | | | | 704/9 |
| 2014/0031114 | A1* | 1/2014 | Davison | A63F 13/65 |
| | | | | 463/31 |

* cited by examiner

*Primary Examiner* — Satwant K Singh
(74) *Attorney, Agent, or Firm* — DLA Piper LLP (US)

(57) ABSTRACT

The present invention is a system and method for generating narrative text utilizing data input from one or more data sources to drive the creation of a narrative text output. Narrative text is generated in accordance with sets of data that provide the scope of text to be generated. A narrative text editor permits automatic generation of narrative text automatically using pre-defined scope for the generated text, or under the guidance of scope input by a user. Generated text retains links to the origin structure and scope used in creation of the narrative text permitting quick troubleshooting of issues in the narrative text generation and rapid review and updating under the guidance of established rule sets or system users.

18 Claims, 6 Drawing Sheets

| Data | | |
|---|---|---|
| 🔍 | New Variable | |
| This post | Edit | Insert > |
| date | Edit | Insert > |
| campaign | Edit | Insert > |
| budget | Edit | Insert > |
| impressions | Edit | Insert > |
| clicks | Edit | Insert > |
| CTR | Edit | Insert > |
| avg. cpc | Edit | Insert > |
| cost | Edit | Insert > |
| avg. position | Edit | Insert > |
| click conversi... | Edit | Insert > |
| cost/conversi... | Edit | Insert > |
| conversions | Edit | Insert > |
| view-through... | Edit | Insert > |
| Saved queries | | |

[ Design ] [ Run ]

PPC conversions for Natural Gas, Inc. were down 20% this week, falling by 252 compared to last week. At the same time, cost per acquisition rose, up 35.6% from $1.92 to $2.61.

| Branch | Expand conditions | Expand variations |
|---|---|---|
| | If (delta_%_conversions > 0 AND delta_total_conversion > 100) OR (delta_%_conversions > 0) ⊗ | |
| | Then write: "were up" OR "rose" | |
| | If (delta_%_conversions < 0 AND delta_total_conversion < 100) OR (delta_%_conversions < 0) ⊗ | |
| | Then write "were down" OR "fell" | |
| | If (delta_%_conversions = 0 AND delta_total_conversion > 100) OR (delta_%_conversions = 0) ⊗ | |
| | Then write "were static" OR "stayed the same" | |

GRAPHICAL USER INTERFACE SYSTEM AND METHOD FOR NATURAL LANGUAGE GENERATION EDITING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

As content providers have moved to broaden and deepen their own news and other media offerings, they have accordingly sought ways to improve efficiency and minimize the cost of content generation. Content generation produced in a narrative language context is particularly difficult and costly to provide, but highly desired by clients of systems that produce news and other text media offerings. Building a framework for automatic generation of narrative language text from incoming data minimizes the need for human interaction in the creation of narrative language text, and presents a cost efficient method for the transformation of data into narrative language text.

The transformation of data into one or more automatically generated narrative language articles is subject to the identification of the data that is of interest to consumers of that data. After the identification of data of interest, the narrative generation must be structured to provide text reflecting the maximum flexibility, breadth, and variation that the data encompasses.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which:

FIG. 6 is an exemplary screen shot of a narrative text editor having post detail code style view consistent with certain embodiments of the present invention.

DETAILED DESCRIPTION

Figure 1:
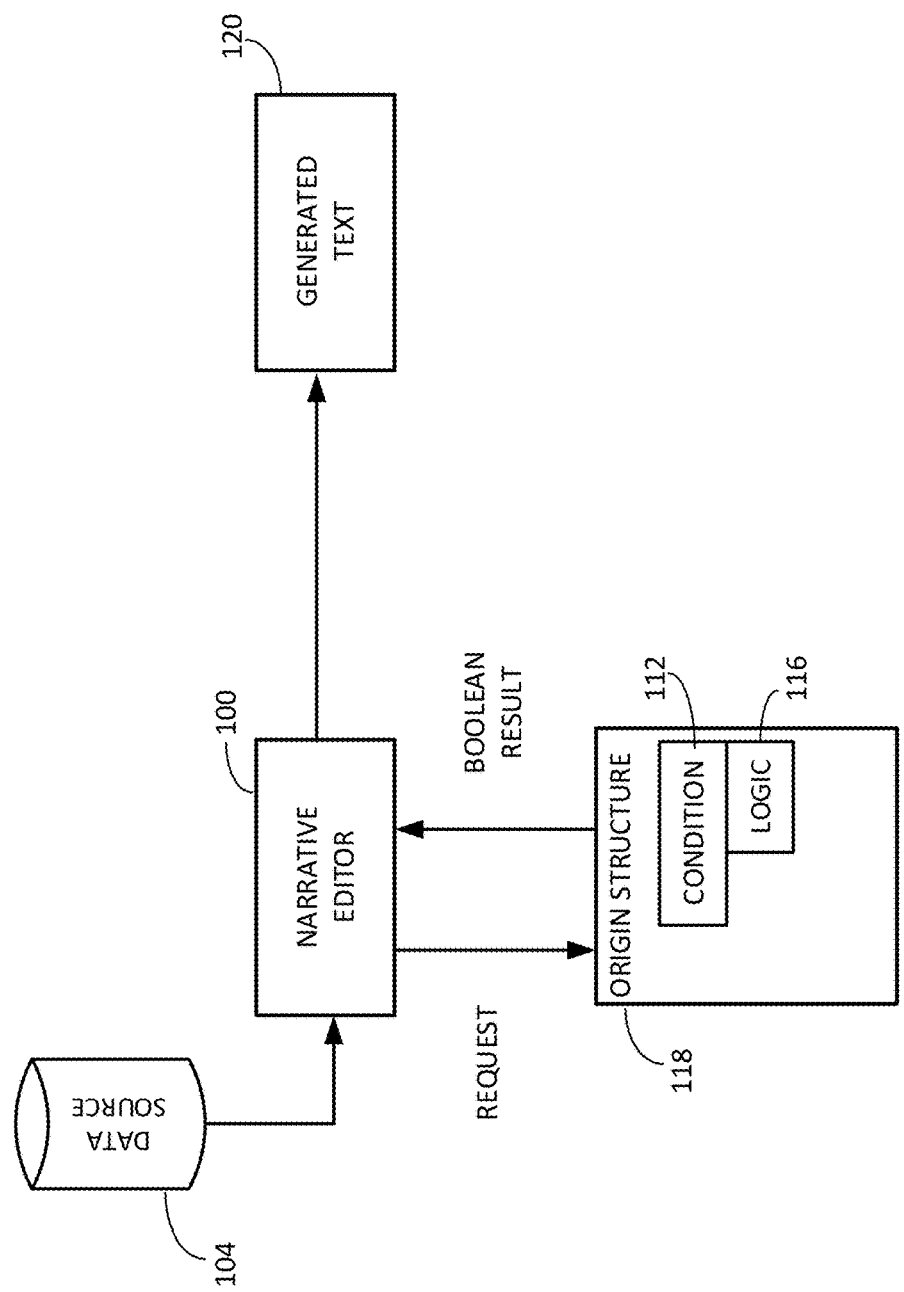
FIG. 1 is an exemplary view of a narrative text editor function consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one, or more than one. The term "plurality", as used herein, is defined as two, or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an exemplary embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to a network can be any computer or information network capable of marshalling, transmitting, routing, directing and/or forwarding data between two or more hardware devices and/or software modules. For example, a network can be a local area network (LAN), a wide area network (WAN), a wireless network, cloud-based networks, or the Internet. A network can include one or more wired and/or wirelessly connected hardware devices including servers, computers, tablets, mobile devices, and handheld devices.

References throughout this document to code can be, but are not limited to, micro-code or micro-instructions, machine instructions, such as produced by a compiler, script created code, code used to produce a web service, and files containing higher-level instructions that are executed by a computer using an interpreter. For example, embodiments may be implemented using Java, C++, or other object-oriented programming languages and development tools. Additional examples of computer code include, but are not limited to, control data, encrypted code, and compressed code.

Reference throughout this document to a processor can be any processor (e.g., a central processing unit (CPU), an application-specific integrated circuit (ASIC), a field programmable gate array (FPGA)) configured to execute one or more instructions received from, for example, a memory device or construct. In an exemplary embodiment, the processor can be a Reduced Instruction Set (RISC) processor. In an exemplary embodiment, the processor may send information (e.g., data, instructions and/or network data packets) to and/or receive information from any memory device or network card in data communication with the processor.

Reference throughout this document to a memory can be any memory device or implementation, for example cloud-based storage devices, RAM, ROM, a hard disk drive, an optical drive, or other removable media configured to store information.

Reference throughout this document to a relational database, including one or more relational database tables, can be any relational database such as, for example, the relational database engine provided by Oracle, Microsoft SQL Server, MySQL, PostgreSQL, Informix and/or other databases that create and maintain databases using relational structures and database management software.

Reference throughout this document to a data store can be any data store such as a third party Application Programming Interface into a data source, a relational database, a non-relational database, or a file. The data store can also indicate stores of data files that are in comma separated value (CSV) formats or data stored in a tabular format, such as spreadsheets as one example.

Reference to "tone" in this document refers to the mood of the generated narrative content created through the use of figurative language, point of view and word choice. In a non-limiting example, a positive performance tone for generated narrative content can be associated with a positive, sanguine, energetic, hopeful, or other similar mood to the generated narrative content.

Reference to "theme" in this document refers to content associated with and/or based at least in part on a given theme, such as a series of events, an ongoing topic of interest, a predefined author style, such as writing or composition style of a given author, journalist or other individual. In a non-limiting embodiment, a narrative framework can include phrases and/or phrase variations constructed in a similar style, fashion and/or manner to those of the author, journalist or other individual.

Reference throughout this document to a "narrative framework" refers to a data construct or module implemented in software and maintained in a hardware storage device and can include phrases and/or other kinds of information and structural and/or data connections between the phrases and other information contained within the narrative framework.

Reference throughout this document to an "origin structure" refers to any logical structural framework that contains a set of data conditions, logic for evaluating those data conditions within a processor to achieve a Boolean result, one or more input data sources, and produces as output one or more narrative text strings based upon the data input and the logical evaluation of the data conditions, including conditions that may be evaluated in a recursive fashion. A narrative framework is a non-limiting example of an origin structure that may be composed of branches, conditions to be evaluated, and variations used as alternative text strings in multiple text string generation actions.

Reference throughout this document to a "Boolean result" refers to a result where one of two conditions is selected, either a TRUE or FALSE or YES or NO result is returned as a result of the evaluation.

Reference throughout this document to a Graphical User Interface ("GUI") may include displays having message areas, interactive fields, pop-up windows, pull-down lists, notification areas, menus, tabs, and/or buttons that can be operated by the user. The GUI may include multiple levels of abstraction including groupings and boundaries. It should be noted that the term "GUI" may be used in the singular or in the plural to describe one or more GUI's, and each of the displays of a particular GUI may provide the user of a client device with a user-friendly interactive environment and information.

Reference throughout this document to a "post" refers to the text output from the narrative framework for a particular scope when generating a text article or report.

Reference throughout this document to "scope" refers to the data that makes a particular post unique and different from all other posts.

A narrative text generation project is composed of the basic functions of uploading data from one or more data sources, accessing that uploaded data and optionally determining the one or more methodologies for grouping the data so as to provide a meaningful expression of that data in generated narrative text, optionally the data to achieve a derivation of items of interest, processing the data using one or more origin structures to automatically generate one or more narrative text articles from the input data, and performing a quality assurance analysis to generate feedback on the generated narrative text prior to the dissemination of the articles generated for the project.

In an exemplary embodiment, the upload of data from one or more data sources is the general starting point for the creation of narrative text that expresses some insight or interesting aspect captured within the data. In a non-limiting example, data from a spreadsheet or other Comma Separated Value (CSV) data source may be received from a data source in combination with either general or specific requests for articles or other informative narrative text. In an embodiment where a specific request for particular areas of interest is received, the creation of narrative text from the input data will proceed using the scope transmitted in the specific request. In this exemplary embodiment, the scope transmitted provides the guidance for the filtering and extraction of the data of interest that satisfies the scope of the request. One or more conditions reflecting the scope may be initiated by selecting a data variable, row, column, or file where the scope is directly relevant to the data selected for evaluation.

In an embodiment where a general request for areas of interest is received, the derivation of areas of interest in line with the general request is complex and may require one or more filter for modification actions for the conditions selected to achieve a scope that meets the request. This embodiment also includes ad hoc and speculative scope definitions in the process of arriving at one or more areas of interest that are consistent with the general request. In non-limiting examples, modification actions may include processing on text such as capitalization or other text modification or mathematical processing on data to derive a new data column for further processing such as percent change in an existing column from a previous time period to the current time period.

The filter actions are performed on the input data source(s) using database query language functions and may permit the selection of any segment of data from the input data source files, from a single row, multiple rows, multiple columns, or an entire data file. Any selection criteria consistent with the areas of interest expressed, or of ad hoc or speculative scope so as to arrive at one of the areas of interest expressed, may be used to group the data from the data source to be used in the generation of one or more conditions for narrative text generation.

Additionally in this exemplary embodiment, formatting options for data variables inserted dynamically into the narrative text strings may be specified or selected by a user. Options may be presented to the user for selection. Such options may include providing case or other information associated with text data, date data may have display options for use in formatting the data associated with dates, and numbers may have formatting information such as absolute value, decimal point location, or display in AP or ordinal formats.

In an embodiment, a condition is evaluated based upon input data from the data source and associated logic of an origin structure and performed in a processor having access to the origin structure and data sufficient to perform a Boolean evaluation and generate a Boolean result for the condition. The condition may be evaluated through additional embedded branches that then must be evaluated prior to completing the evaluation of preceding parent branches. In this condition, the embedded branches must be evaluated to completion before the parent branch may be evaluated to a Boolean result. These embedded branches may form a recursive evaluation structure in which each subsequent branch is evaluated to a Boolean result, and the condition directs the creation of narrative text in the form of natural language text strings addressing each branch included in the sequence of branches.

In this exemplary embodiment, an input data source may be a relational database, a non-relational database, an excel file, a file in JavaScript Object Notation (JSON) format, an XML file, a spreadsheet, a file in tabular format, or a file in a comma separated value (CSV) format. An origin structure may contain one or more conditions that evaluate to a Boolean result and the Boolean evaluation is performed in a processor having access to logic and data sufficient to perform the Boolean evaluation, where the rendered text from a condition may include the need to evaluate nested conditions with further text options and may include other conditions that must be evaluated before the parent condition result may be completed. Such nested conditions may consist of multiple tiers of conditions to successfully generate narrative text that expresses the scope of the data input, or that may vary portions of the generated narrative text based upon data conditions without affecting non-selected portions of the generated narrative text.

In an exemplary embodiment, the evaluated condition directs the creation of natural language text strings. A narrative editor provides the user with the ability to create and direct this creation of natural language text strings from a single condition, or from multiple conditions that may then be combined to form longer or more complex natural language origin structures. Building a condition may begin with the selection of a data field, row, or table of interest and within the scope of interest of the user. Upon selection of data of interest, a branch may be created around which conditional logic may be specified for evaluation. The narrative editor may assist the user through the display of drop down views populated with one or more data functions such as a list of expressions available to the user for evaluation. A search function may also be provided to quickly locate the expression(s) that are desired for the created branch.

In the exemplary embodiment, additional data functions may be added or created to present the user with greater variation or more complex comparisons in evaluating the selected branch. In this exemplary embodiment, the insert function permits the user or the narrative editor system to continually update the expressions available to evaluate data associated with any branch. Individual branches may be input by a user to create branches for further evaluation that are specific to the scope in which a user is interested. Branches may also be deleted by a user to remove branches in which the user no longer has an interest, or when the branch evaluates to a scope that is contrary to the interest of the user. Thus, the narrative editor presents the user with the ability to create, edit, update, and/or delete branches to be evaluated. These abilities are provided as insert functions to an expression drop down box.

In the exemplary embodiment, multiple expressions selected for the evaluation of a branch may be joined together. Additionally, multiple conditions may be added to the evaluation of the branch. Joined expressions and multiple conditions may be related through the use of Boolean operators such as "AND" or "OR" to present greater flexibility in the evaluation of the branch and provide greater variability in the creation of narrative text. Additionally, the user may provide logic considerations such as actions to take if the branch evaluates to a FALSE value, as opposed to actions to be taken if the branch evaluates to a TRUE value. Additional logical considerations may also be added to provide the user with the ability to optimize or personalize further the expression of the narrative text created from the branch.

In a non-limiting example, a user may be presented with the narrative text generated by the selected branches and conditions as evaluated by the logic and expressions specified. The system may present one of two types of displayed narrative text strings: a preview display and a generated text display. The main display (the preview version) is simply a version of the article that by default shows the first text option for each of the top-level branches, and can be navigated by clicking on nested branches. It also allows a user to preview other text options in context by clicking on one of the variations at the bottom of the screen to observe the change reflected up top in the narrative preview. The user may then switch to a second display view, which is an output view that shows a generated piece of narrative text.

The narrative editor may reveal all branches and nested branches in the generated narrative text. The user may select the branch or nested branch presented in the narrative text to be taken to the portion of the origin structure that created the selected narrative text portion. In this manner, the user may review the origin structure for accuracy and compensate for, or correct, any portion of the origin structure that created narrative text strings that were incorrect, undesirable, or otherwise not consistent with the scope required. In an alternative embodiment, the generated narrative text may be saved to a digital memory store and transmitted to a QA process either upon saving the generated narrative text, or recalled from digital storage for later review either by the user or a QA process.

In an exemplary embodiment, the narrative editor may present the user with a function to compare variations between previous data values and more recent data values for the same input data source. When the user is interested in changes to data sets that have occurred over a time span, the function may utilize an origin structure that was created for a particular set of conditions and branches in the past and compare a more recent upload of the same data conditions and branches to derive differences in the data set between the previous data values and the current data values. The difference may then be input to the narrative editor as the set of conditions and branches to be evaluated. This evaluation may then generate narrative text built around the reporting of the differences between the previous data values and the current data values for the input data source.

Upon completion of the generation of the narrative text strings, all branches may be collapsed to present a display of the code language created from the selection and definition of the conditions so as to permit the user to utilize the system from a code-style point of view. Upon the initiating the operation of the narrative text generator for the defined origin structure, the narrative text may be presented to the user in a display view for review.

To maintain the quality of the articles produced by a narrative text generator for any given project, a quality assurance (QA) function is automatically applied to the generated text. The QA function associated the branch, embedded branch, condition, and or variation for each portion of generated text in all posts, for each scope requested. An error may be automatically generated by the system or by a user and may be defined as incorrect words, sentence inconsistencies, grammar infractions, tone inconsistencies, and word choices inconsistent with the scope within the narrative text analyzed.

With regard to FIG. 1, this figure presents an exemplary view of a narrative text editor function consistent with certain embodiments of the present invention. The primary focus of a project is the creation and optimization of narrative text generated in natural language, where the narrative text represents data input from a data source evaluated in accordance with the scope identified for the project. A Boolean is the expected result from the evaluation. In this figure, the text generation project begins with the initialization of the narrative text editor 100 module. The narrative text editor downloads data from one or more data sources 104 that are to be used as the basis for the creation of narrative text. The input data is grouped automatically according to a rule set describing a scope for the text to be generated, or grouped under the direction of a user. The user may load a pre-set scope or create a new scope for use in the grouping the input data and defining the narrative text to be generated.

In an exemplary embodiment, the narrative editor creates one or more conditions 112 either automatically or under the direction of a user wherein the condition 112 uses logical evaluation criteria 116 to select one of two possible results, a Boolean result, for the condition 112. The origin structure 118 generates one or more narrative text strings using the scope of the data grouping based upon the evaluation of the conditions 112. The narrative editor displays the generated narrative text 120. Individual branches may be input by a user to create branches for further evaluation that are specific to the scope in which a user is interested. Branches may also be deleted by a user to remove branches in which the user no longer has an interest, or when the branch evaluates to a scope that is contrary to the interest of the user. Thus, the narrative editor presents the user with the ability to create, edit, update, and/or delete branches to be evaluated. These abilities are provided as insert functions to an expression drop down box.

In a non-limiting example, the origin structure may present a logical hierarchy that is composed of branches that represent a particular data point to be evaluated, where the branch presents a different result based upon a condition 112 to be selected, and variations that may be included to provide different text strings to provide variety in the resulting generated text. The generated text 120 is then visible to the user for review.

Figure 2:
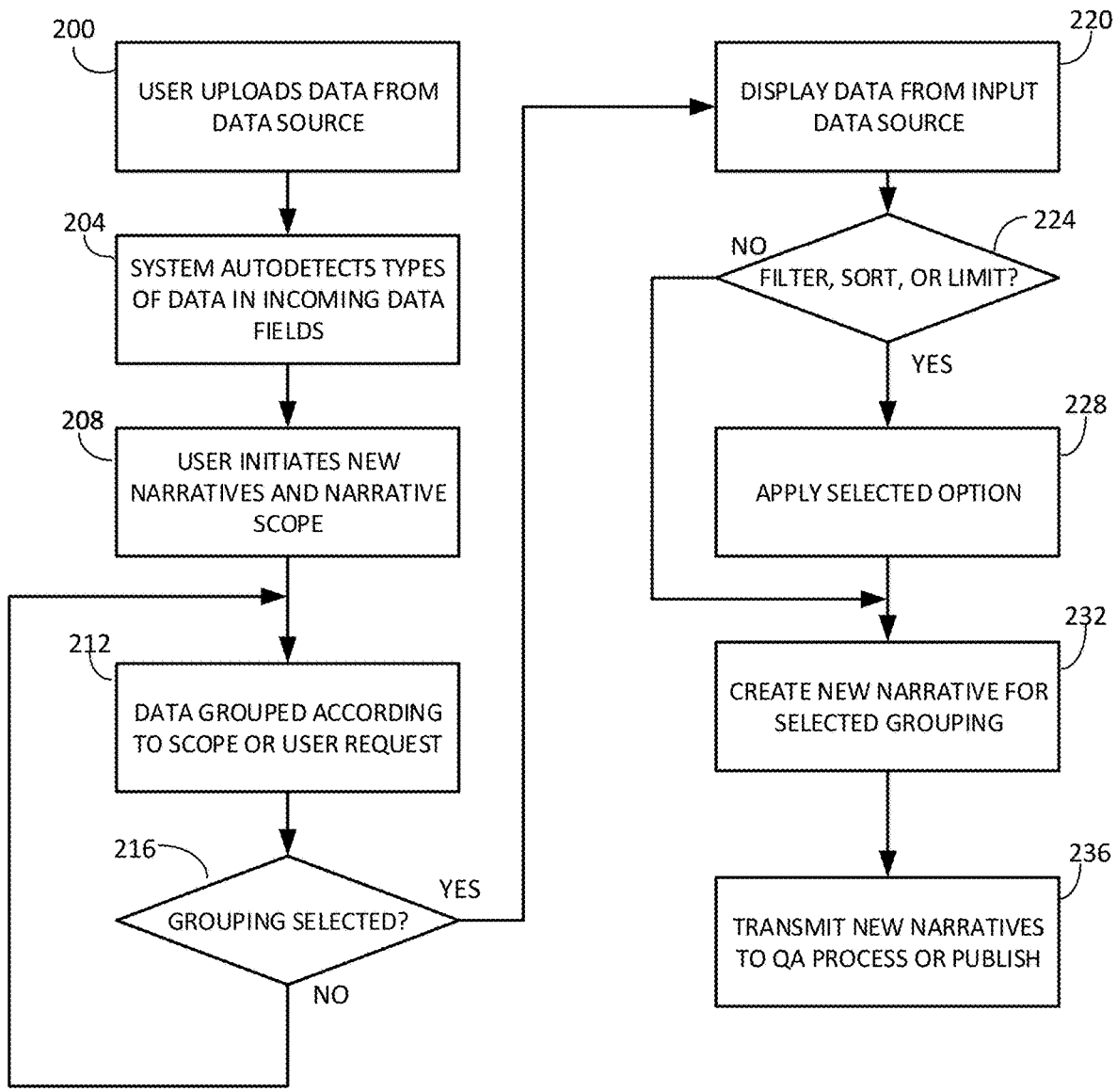
FIG. 2 is an exemplary process flow of a narrative text generator function consistent with certain embodiments of the present invention.

With regard to FIG. 2, this figure presents an exemplary process flow of a narrative text generator function consistent with certain embodiments of the present invention. When a project is first created, it comprises a narrative generator and one or more data sources. As a function of the project, a user may desire to review the results created by the narrative text generator to optimize the generated text so as to provide assurance that the quality of the generated text meets the user's standards prior to publishing the post to a client. To initiate this function, the narrative text editor uploads data to be used in the generation of narrative text strings from one or more data sources 200.

In an exemplary embodiment, upon data upload, where the data may be in a variety of formats such as a relational database, a non-relational database, an excel file, a file in JavaScript Object Notation (JSON) format, an XML file, a spreadsheet, a file in tabular format, or a file in a comma separated value (CSV) format, the narrative editor may autodetect the types of data contained in the incoming data fields. At 208, a user may then initiate one or more new narratives by entering requests for particular data to be evaluated and defining the scope of the text to be generated. At 212, the narrative editor system groups the data according to the scope or user requests. In an alternative embodiment, a pre-defined scope may be recalled from digital storage and presented to the narrative editor to follow in grouping the data from the data source(s). At 216, the narrative editor presents the user with the groupings thus far defined and provides the user with the option to select a grouping for use in the current iteration of narrative text generation.

In an exemplary embodiment, at 220 upon selection of the desired grouping, the system may display the data associated with the selected grouping as it has been uploaded from the data source. The user, at 224, is provided with the option to filter, sort, or limit the data within the selected grouping prior to the generation of narrative text strings. In this manner, a user may remove portions of the group that have less interest, or limit the processing to a representative sample of the group so as to reduce the amount of time required to produce the narrative text for the user's review. If a filter, sort or limit criterion is selected, the system is operable to apply the selection option, at 228, to the data contained in the selected grouping. If no filter, sort, or limit option is selected, the data grouping is processed as selected.

At 232, one or more conditions are evaluated in a processor to a Boolean result based upon input data from the data source and associated logic of the origin structure. In this embodiment, posts may be narrative text generated from the evaluated condition. At 236, the narrative text strings created in accordance with the input grouping are designated as posts. The posts are customized for particular objectives and each segment of narrative text is associated with an origin structure. The posts are published to the narrative editor display view for review by a user, or in an alternative embodiment, may be stored in digital memory for later review.

In an exemplary embodiment, the narrative text display may present the origin structure to a user when a segment of narrative text is selected, and the origin structure is stored with optimization instructions in a log maintained on an electronic storage device. During review of the generated narrative text, if inconsistencies, errors, or other issues are discovered the user may select that section of the generated text within the display view of the narrative text display. Upon selection, the portion of the origin structure that generated the selected narrative text string will be presented. The user may select the displayed portion of the origin structure to review, update, or correct the origin structure to resolve the issue. Alternatively, the user may elect to pass observations to the QA process for later resolution by a QA user.

Figure 3:
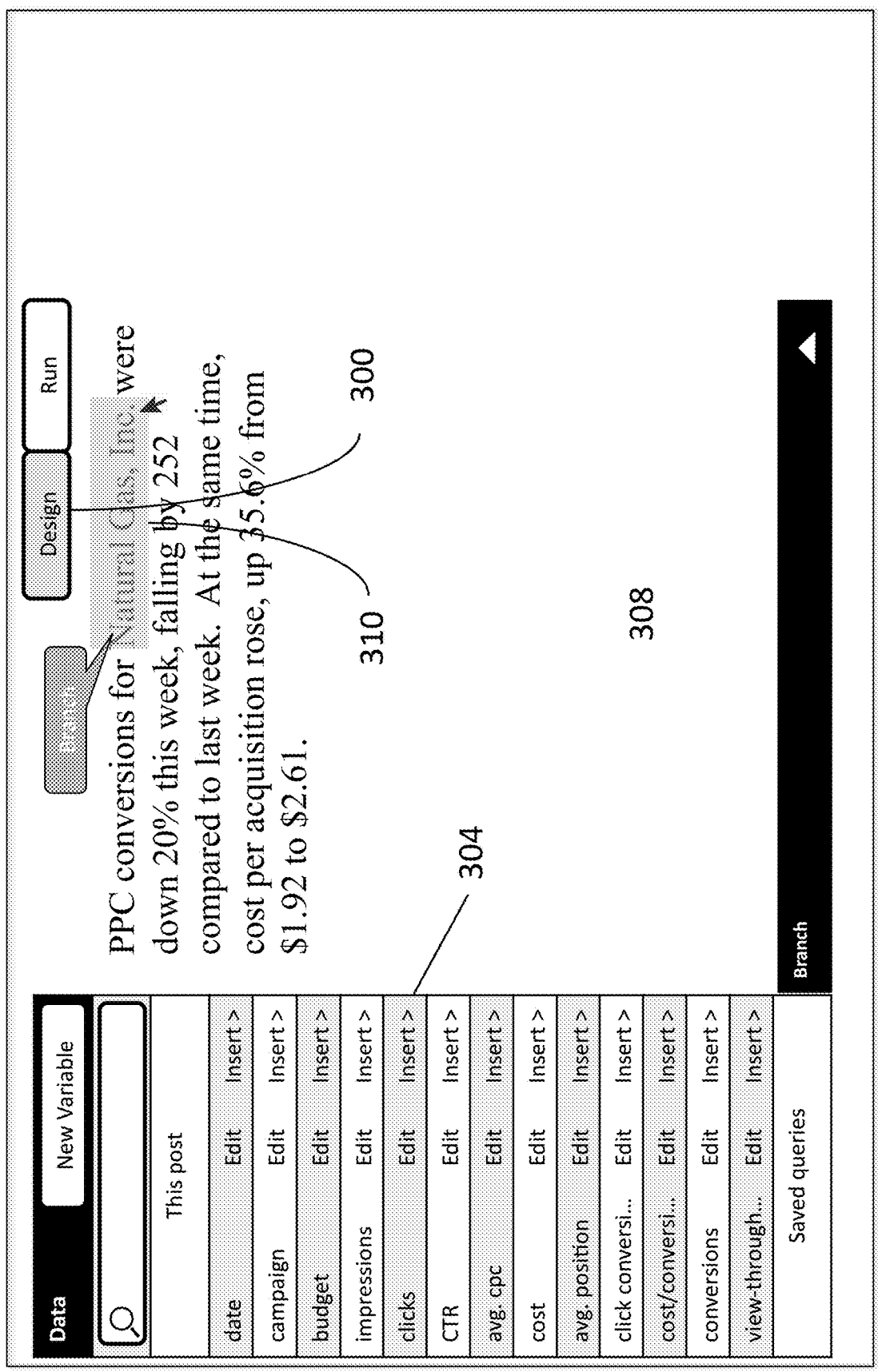
FIG. 3 is an exemplary screen shot of a narrative text editor consistent with certain embodiments of the present invention.

With regard FIG. 3, this figure presents an exemplary screen shot of a narrative text editor display consistent with certain embodiments of the present invention. In this non-limiting example, a narrative text editor project is presented. The user may select an option 300 to build a narrative by selecting and entering data that is of interest to the user for this project, or the user may select an option to preview the text to be generated from the data entered and/or selected.

The data 304 has been grouped in accordance with either pre-set or dynamically entered scope for the generation of narrative text. Selecting the design option permits the user to activate a pre-determined rule set for use in generating narrative text, or permit the user to select one or more data groupings 304 from the data pane or enter data to be used in conjunction with the uploaded and selected data groupings 304.

The narrative text editor display pane 308 provides a view of representative generated narrative text. The generated narrative text retains links to the origin structure for the narrative text. During a review of the generated narrative text, when a user selects a data variable 310 in the generated text, the selected data variable 310 is highlighted and the link to the origin structure is active.

Figure 4:
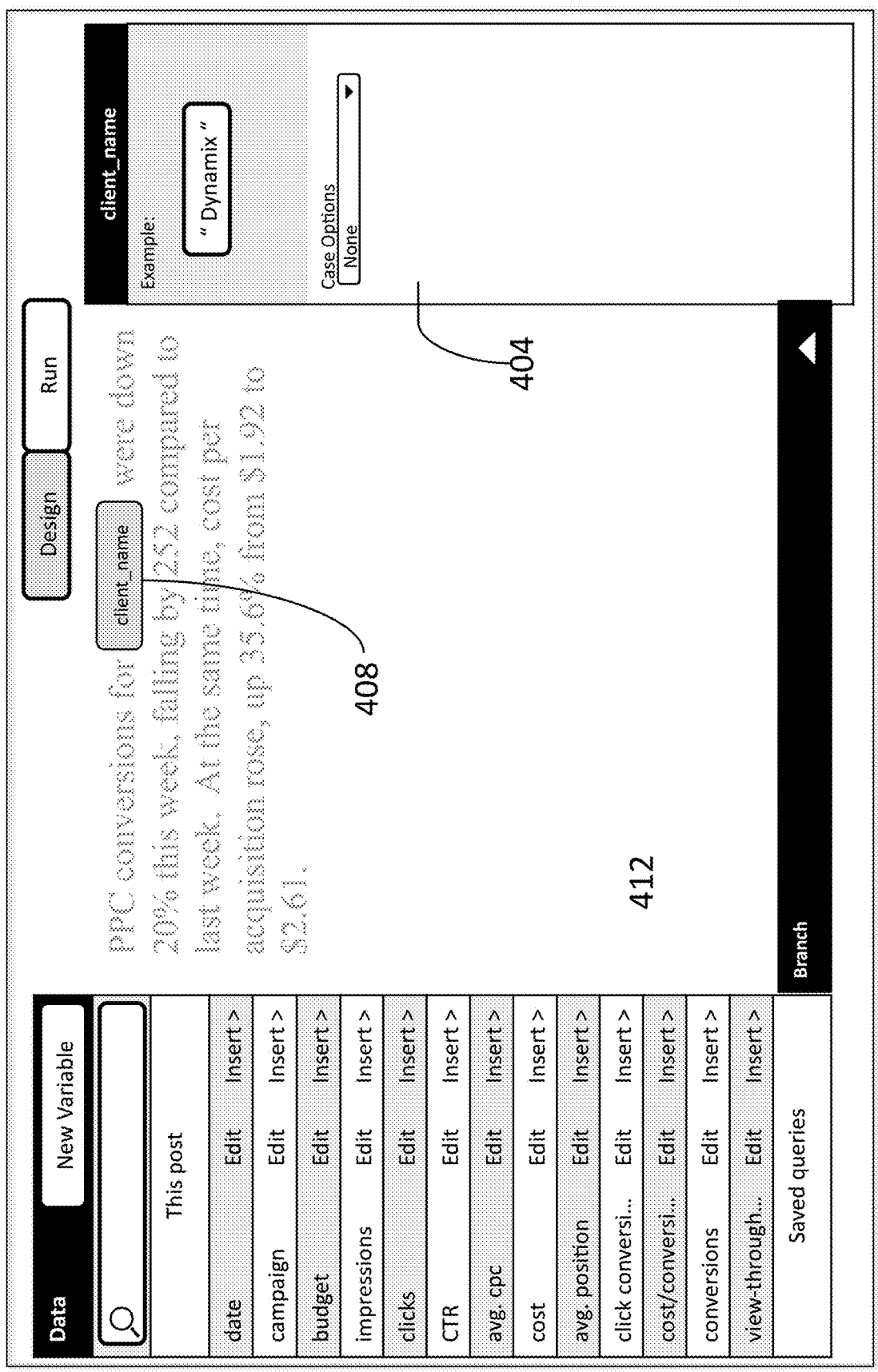
FIG. 4 is an exemplary screen shot of a narrative text editor having a formatting information view consistent with certain embodiments of the present invention.

With regard to FIG. 4, this figure presents an exemplary screen shot of a narrative text editor having a formatting information view consistent with certain embodiments of the present invention. In this non-limiting example, a formatting pane 404 may be active to display options for formatting the data type associated with the currently selected data variable 408. In a non-limiting example, the formatting pane 404 may provide a listing of the options for formatting the selected variable 408. In this example, text data may have case options displayed, date data may have date display options displayed, and number data may have controls over absolute value, decimal points or displaying in AP or ordinal formats. A user may also input data directly into the narrative text editor display pane 412 for inclusion in the generated narrative text.

Figure 5:
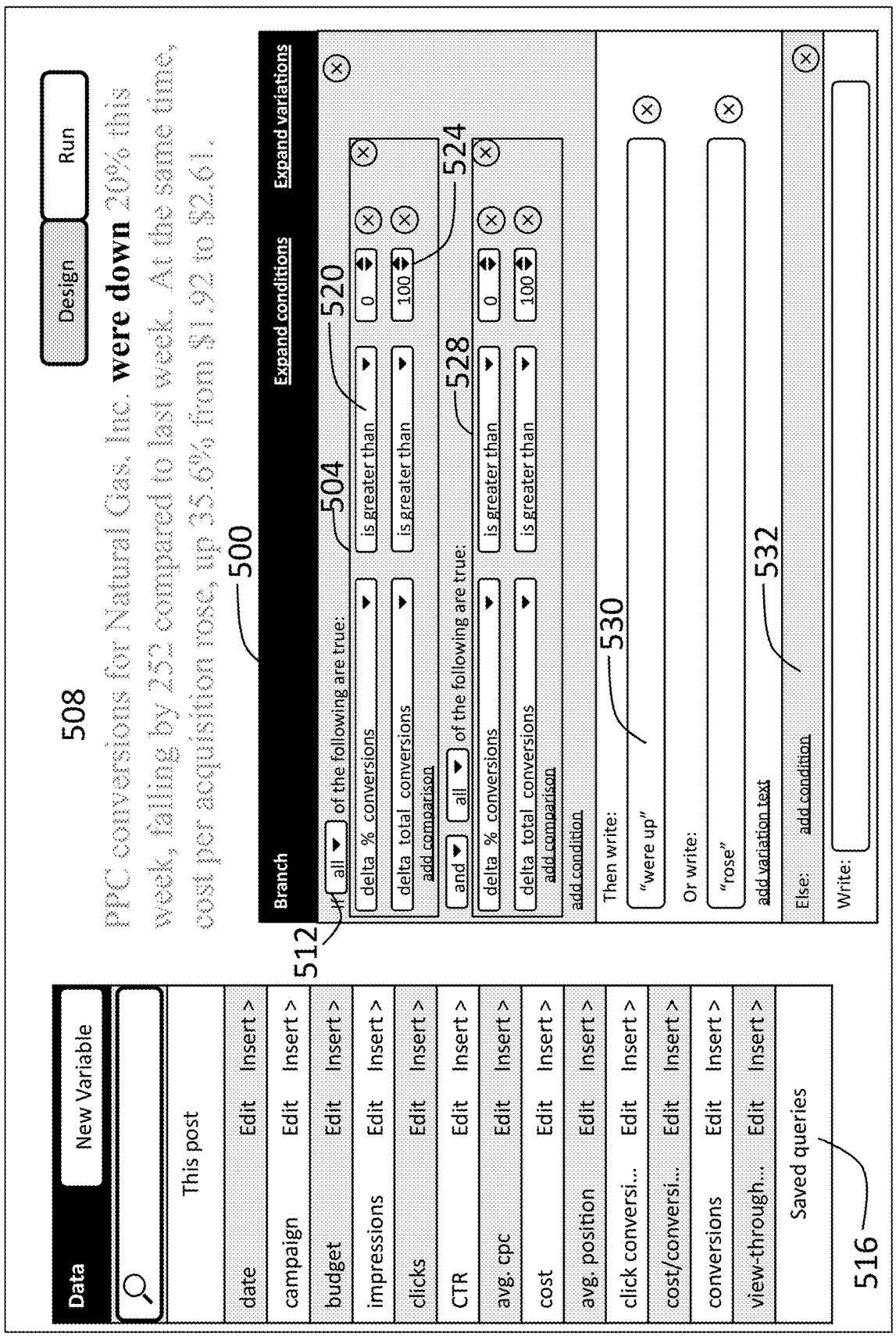
FIG. 5 is an exemplary screen shot of a narrative text editor with a branch construction view consistent with certain embodiments of the present invention.

With regard to FIG. 5, this figure presents an exemplary screen shot of a narrative text editor with a branch construction view consistent with certain embodiments of the present invention. In an exemplary embodiment, an origin structure provides the dynamic structure for the evaluation of choices that are defined by the system and/or those that are user defined to express the scope of narrative text to be generated. The narrative text editor imports branches to be evaluated, permits the definition of branches by a user, or any combination of automatic and user defined branch definition actions. In this embodiment, upon the selection of branch selector, indicating that a user is initiating a branch definition action, the narrative editor inserts the branch indication into the origin structure and displays a view of the branch input function 500.

In a non-limiting example, the branch input function 500 is operable to open one or more condition input areas 504. A condition input area 504 may take the form of a drop down menu, a drop down display, an input box, or any other displayable input form that is consistent with the creation and definition of a condition to be evaluated by the system. A first condition input area 504 opens in the narrative editor display panel 508 to prompt a user to create or edit a condition 512. The user may select one or more of the data functions 516 that are available from the input data source. The selection may be performed by selecting a data function 516 from a list presented as a drop down menu, a prefilled list, or any other list display format. The list presented to the user may be searchable to provide the user with a quick means to review and discover data functions 516 that are available for use with the condition 512.

Upon selection of a data function 516, a conditional display menu 520 in the form of a drop down menu, or any other preferred list display, is presented to the user. The narrative editor may also import conditions to be evaluated automatically based upon a pre-determined rule set. The conditional display menu 520 presents the user with one or more options for conditions to be evaluated for the data function 516 currently selected. In a non-limiting example, options may include "is greater than", "is less than", or any other condition that may be evaluated to achieve a TRUE or FALSE, Yes or No, result. A data expression display list 524 may also be populated for the selected data function 516 upon selection. Additionally, the user may add other data functions to the expression display list 524 to accommodate more advanced or newly created comparisons for the condition. These additional comparisons may be added by selecting an insert edit function and entering the additional comparison into the expression display list 524.

In the exemplary embodiment, the narrative editor permits the creation of more complex branches through joining multiple conditions for a given branch 500. Additional conditions may be selected and defined in the same manner as the creation of the initial condition. Subsequent conditions may then be joined utilizing AND, OR, or other conditional logic to perform multiple condition evaluations for multiple data functions. In this embodiment, each added condition evaluation presents the user with the ability to add logical extensions to the origin structure when creating narrative text for the data being evaluated.

In this exemplary embodiment, additional blocks of conditions 528 may be specified by a user or the system. The additional blocks of conditions 528 may be selected and specified in the same fashion as the previously defined conditions 504, but may represent a differing scope of data to be considered, or may represent an ad hoc set of conditions that a user is using for review to determine the sufficiency and efficacy of the generated narrative text in representing the desired scope of generated text. The additional blocks of conditions 528 may be joined to earlier blocks of conditions 504 through the use of AND, OR, or other logical operations. The user may select or input the logic to be used when joining later blocks of conditions to earlier blocks of conditions. In this fashion, very complex narrative text may be generated from relatively straightforward definition of the conditions and data functions to be evaluated.

Upon completion of the selection of conditions for the branch 500, bridge text or other text that may be important to readability or variation of the narrative text to be generated may be specified 530. This variation text 530 presents the system or the user with the ability to vary the generated narrative text so as to minimize any unnatural tone or robotic character in the generated narrative text. The user may insert additional variation text strings to create very broad character, tone, or style choices for the generated narrative text.

In the exemplary embodiment, the user or system may also select and/or define logic for use when the branch alternative to the desired evaluation occurs. In a non-limiting example, if the user creates a set of branches that will create narrative text based upon the evaluation result being TRUE, the user may also specify conditions and logic for the system performance if the evaluation result is FALSE. This logic may be added as an "else" branching 532 and the user may create logic to be performed for the conditions associated with the branch alternative evaluation. The user selects and enters conditions for the alternative branch evaluation 532 in the same manner as the conditions entered and selected for the primary branch evaluation.

With regard to FIG. 6, this figure presents an exemplary screen shot of a narrative text editor having post detail control consistent with certain embodiments of the present invention. In a non-limiting example, all branches may be collapsed to present a display of the code language 600 created from the selection and definition of the conditions so as to permit the user to utilize the system from a code-style point of view.

While certain illustrative embodiments have been described, it is evident that many alternatives, modifications, permutations and variations will become apparent to those skilled in the art in light of the foregoing description.

What is claimed is:

1. A method for generating data driven natural language text via a computer-implemented graphical user interface and narrative content generation system, comprising:
   receiving, at a computing device coupled to a communications network, data from one or more data sources;
   grouping, at the computing device, the received data in accordance with a pre-defined scope;
   evaluating, at the computing device, a condition and an associated origin structure to generate a set of customized segments of narrative text for the data scope, wherein the origin structure comprises logical structural framework that includes a set of data conditions and wherein the narrative text is based on logical evaluation of the set of data conditions, the customized segments maintaining a link to the origin structure;
   presenting, through a display at the computing device, a user interface comprising:
      a content preview region for presenting a preview comprising the customized segments of narrative text; and
      a data variable display region for presenting data variables grouped according to the pre-defined data scope;
   receiving a user selection of a segment of narrative text on the content preview region; and
   presenting a portion of the origin structure linked with the user-selected segment via the user interface.

2. The method of claim 1, where the data source further comprises a relational database, a non-relational database, an excel file, a file in JavaScript Object Notation (JSON) format, an XML file, a spreadsheet, or a file in a comma separated value (CSV) format.

3. The method of claim 1, further comprising performing, at the computing device, a comparison of previous input data values against current input data values to determine the difference between the data values; and wherein the generated set of customized segments of narrative text are generated in accordance with the data value differences.

4. The method of claim 1, the presented user interface further comprising a data formatting region for presenting formatting options for the user selected segment of narrative text.

5. The method of claim 1, further comprising receiving, at the computing device, input from a user for inclusion with the customized segments in the content preview region of the display.

6. The method of claim 1, further comprising presenting, through the display at the computing device, a second user interface for defining a condition of comparing data variable values and comprising:
   a data variable selection region for receiving a user selection of one or more data variables;
   a data comparator region for receiving a user selection of a comparison operation for comparing values of the one or more selected variables;
   a first comparison result region for receiving a first comparison result phrase pattern, to be associated in the origin structure with a first outcome for the application of the comparison operation to the one or more variables; and
   a second comparison result region for receiving a second comparison result phrase pattern, to be associated in the origin structure with a second outcome for the application of the comparison operation to the one or more variables;
   wherein the presented preview includes either the first comparison phrase pattern or the second comparison phrase pattern.

7. The method of claim 6, wherein the evaluated condition is the condition defined via the second user interface.

8. The method of claim 1 further comprising importing an origin structure and condition for the evaluation from a database of origin structures coupled to the computing device.

9. The method of claim 8, further comprising:
   receiving a user edit to the origin structure and condition via the user interface; and
   causing the edited origin structure and condition to be stored in the database.

10. A computer-implemented graphical user interface and narrative content generation system for generating data driven natural language text, comprising:
    one or more data sources coupled to a communications network;
    a computing device comprising a processor and a display unit, the computing device coupled to the data sources through the communications network and operable to:
       receive data from the one or more data sources and group the data in accordance with a pre-defined scope;
       evaluate a condition and an associated origin structure to generate a set of customized segments of narrative text for the data scope, wherein the origin structure comprises logical structural framework that includes a set of data conditions and wherein the narrative text is based on logical evaluation of the set of data conditions, the customized segments maintaining a link to the origin structure;
       generate a display for the display unit, the display comprising:
          a content preview region for presenting a preview comprising the customized segments of narrative text; and
          a data variable display region for presenting data variables grouped according to the pre-defined data scope;
       receive a user selection of a segment of narrative text on the content preview region; and
       present a portion of the origin structure linked with the user-selected segment via the display.

11. The system of claim 10, where the data source comprises a relational database, a non-relational database, an excel file, a file in JavaScript Object Notation (JSON) format, an XML file, a spreadsheet, or a file in a comma separated value (CSV) format.

12. The system of claim 10, the computing device further operable to perform a comparison of previous input data values against current input data values to determine the difference between the data values; and wherein the generated set of customized segments of narrative text are generated in accordance with the data value differences.

13. The system of claim 10, the generated display further comprising a data formatting region for presenting formatting options for the user selected segment of narrative text.

14. The system of claim 10, the computing device further operable to receive input from a user for inclusion with the customized segments in the content preview region of the display.

15. The system of claim 10, the computing device further operable to generate a second display for the display unit, the second display for defining a condition of comparing data variable values and comprising:
- a data variable selection region for receiving a user selection of one or more data variables;
- a data comparator region for receiving a user selection of a comparison operation for comparing values of the one or more selected variables;
- a first comparison result region for receiving a first comparison result phrase pattern, to be associated in the origin structure with a first outcome for the application of the comparison operation to the one or more variables; and
- a second comparison result region for receiving a second comparison result phrase pattern, to be associated in the origin structure with a second outcome for the application of the comparison operation to the one or more variables;

wherein the presented preview includes either the first comparison phrase pattern or the second comparison phrase pattern.

16. The system of claim 15, wherein the evaluated condition is the condition defined via the second display.

17. The system of claim 10 further comprising a database of origin structures coupled to the computing device, the computing device further operable to import an origin structure and condition from the database for the evaluation.

18. The system of claim 17, the computing device further operable to:
- receive a user edit to the origin structure and condition via the generated display; and
- store the edited origin structure and condition to the database.

* * * * *